Patented Apr. 5, 1927.

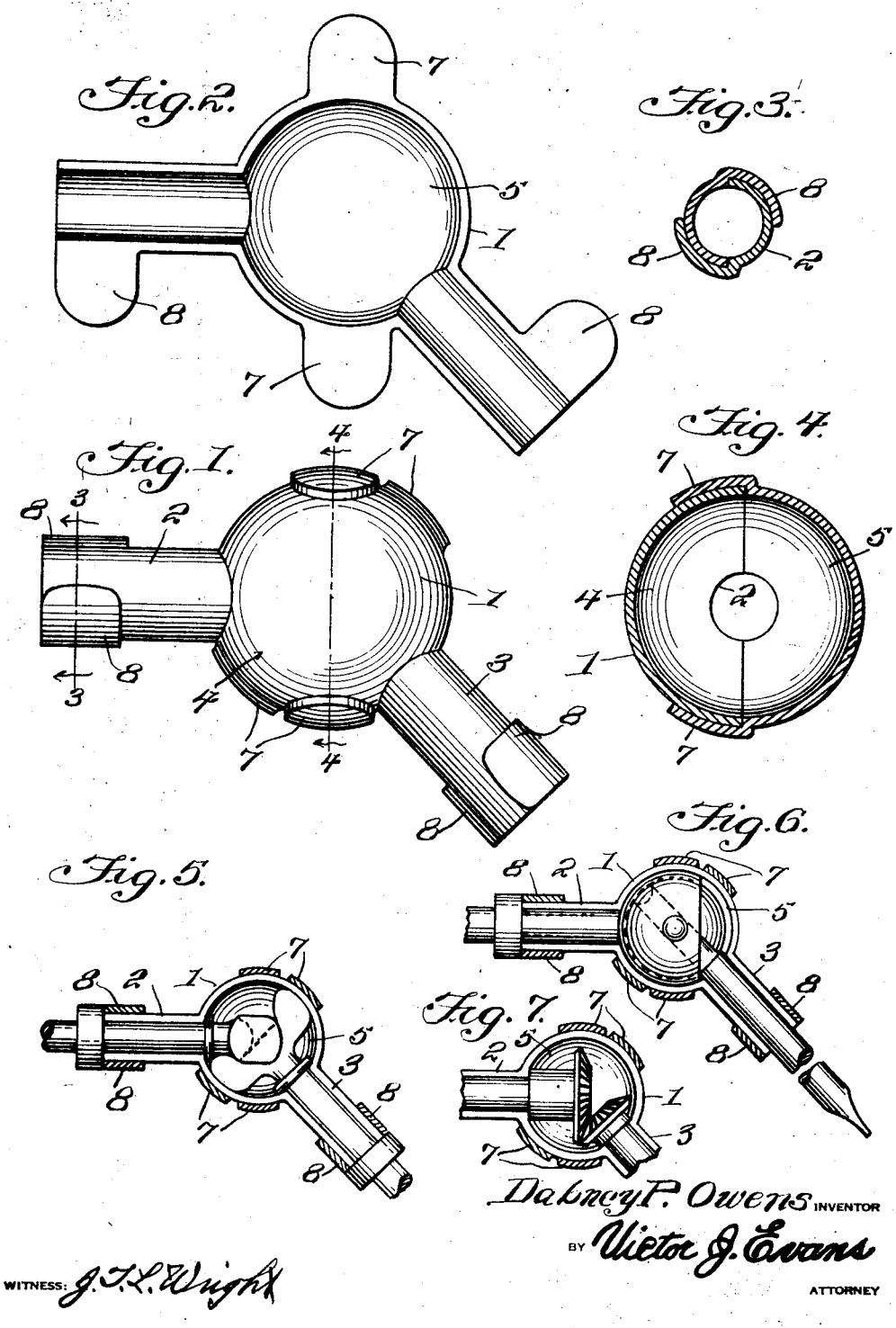

1,623,200

UNITED STATES PATENT OFFICE.

DABNEY P. OWENS, OF LAKE WORTH, FLORIDA.

FIXED HOUSING FOR UNIVERSAL CONNECTIONS.

Application filed July 10, 1925. Serial No. 42,737.

My present invention has reference to a fixed housing for universal connections between a drive and a driven shaft.

My object is to simplify and improve the existing art by producing a housing for this purpose that is stamped from sheets of suitable metal, and which, when assembled, provides a spherical housing having tubular members extending angularly therefrom for the reception respectively of the drive and the driven shaft, of the universal joint or connection being arranged in the spherical body of the housing, while means integrally formed in the confronting ends of the housing sections are provided for fixedly associating said sections.

A still further object is the provision of a fixed housing for universal connections between a drive and a driven element that comprises a spherical body in which the universal connection is arranged and which body is provided with angular tubular extensions for the reception of the drive and the driven shaft of the universal joint or connection, said body and its tubular extensions being formed of two members that have on their meeting ends bendable fingers, whereby the fingers on one of the sections are bent over the opposite section so that the sections are easily, quickly and rigidly connected, but also whereby the said sections may be disassociated by unbending the fingers.

The drawings illustrate a satisfactory embodiment of my improvement reduced to practice.

In the drawings:—

Figure 1 is a side elevation of a fixed housing for universal connections in accordance with this invention.

Figure 2 is an inner face view of one of the sections.

Figure 3 is a sectional view on the line 3—3 of Figure 1.

Figure 4 is a sectional view on the line 4—4 of Figure 1.

Figure 5 is an approximately longitudinal sectional view showing the manner in which one form of universal joint connection is housed in the improvement.

Figures 6 and 7 are substantially similar views showing different forms of universal connections.

As disclosed by the drawings, the improvement comprises a spherical body 1 that has a central tubular extension 2 formed therewith and has on its side opposite, a similar extension 3. The tubular extension 3 is arranged angularly with respect to the tubular member or extension 2.

By reference to Figures 2, 3 and 4 of the drawings, it will be noted that the body 1 and its extensions 2 and 3, is formed in two sections, each of which being substantially similarly constructed. Thus the body 1 is formed of two substantially semi-spherical hollow members 4 and 5. The hollow members 4 and 5 are provided with semi-tubular extensions, which, when brought together provide the tubular elements 2 and 3, the sections 4 and 5 providing the hollow spherical member 1. The edges of the sections at the body and at the extensions thereof, are formed with bendable fingers 7 and 8—8, respectively. These fingers, when the body sections are brought together, are bent over the adjacent sections, as clearly disclosed in Figures 1, 3 and 4 of the drawings. The sections are stamped, and may thereby be quickly produced in large quantities. The sections are readily brought together and the fingers 7 and 8 bent thereover to provide a fixed housing for universal connections. By unbending the fingers the housing sections may be disassociated.

By reference to the several figures of the drawings it will be seen that the fingers 7 on one of the housing sections are arranged at a different angle from those on the second housing section, whereby, when the fingers are bent over the said sections, as illustrated in Figures 1, 5, 6 and 7 of the drawings. The confronting edges of the fingers of the respective housing sections will be in contacting engagement with each other, so that any tendency of one section to turn independently of the other section in any direction will be positively prevented.

In Figures 5, 6 and 7 of the drawings I have illustrated different universal connections which may be housed in the improvement.

Having described the invention, I claim:—

A fixed housing for universal connections, comprising a hollow spherical body having angularly disposed tubular members extending therefrom, said housing and tubular members being constructed of two sections which have their confronting edges in contacting engagement, the housing sections having their edges each formed with a pair of outstanding fingers designed to be bent over the other housing sections, the fingers on one of the housing sections being arranged angularly with respect to the fingers on the second housing section, whereby the adjacent edges of the said bent fingers will be arranged in contacting relation, and the sections comprising the tubular extensions being also formed with fingers designed to be bent over each other.

In testimony whereof I affix my signature.

DABNEY P. OWENS.